US012609863B2

(12) United States Patent
Edwards et al.

(10) Patent No.: US 12,609,863 B2
(45) Date of Patent: Apr. 21, 2026

(54) OBSERVABLE FEATURE CONFIGURATION DELIVERY

(71) Applicant: Itron, Inc., Liberty Lake, WA (US)

(72) Inventors: Elliott Buhr Edwards, Colbert, WA (US); Robert Wayne Simon, Rathdrum, ID (US); Andrew John Keats, Seneca, SC (US); Jason Wayne Estes, Spokane, WA (US)

(73) Assignee: Itron, Inc., Liberty Lake, WA (US)

( * ) Notice: Subject to any disclaimer, the term of this patent is extended or adjusted under 35 U.S.C. 154(b) by 94 days.

(21) Appl. No.: 18/588,146

(22) Filed: Feb. 27, 2024

(65) Prior Publication Data

US 2025/0190222 A1     Jun. 12, 2025

Related U.S. Application Data

(60) Provisional application No. 63/606,879, filed on Dec. 6, 2023.

(51) Int. Cl.
H04L 41/085          (2022.01)

(52) U.S. Cl.
CPC ................................. H04L 41/085 (2013.01)

(58) Field of Classification Search
CPC ..................................................... H04L 41/085
USPC ........................................................ 709/223
See application file for complete search history.

(56) References Cited

U.S. PATENT DOCUMENTS

| | | | |
|---|---|---|---|
| 8,307,121 | B2 | 11/2012 | Wei |
| 10,136,060 | B2 | 11/2018 | Liu et al. |
| 10,803,518 | B2 | 10/2020 | Raleigh et al. |
| 11,005,713 | B2 | 5/2021 | Brown |
| 11,108,630 | B2 | 8/2021 | Woodland |
| 11,397,709 | B2 | 7/2022 | Vermeulen et al. |
| 11,469,949 | B2 | 10/2022 | Woodland |
| 11,494,837 | B2 | 11/2022 | Raleigh et al. |

(Continued)

FOREIGN PATENT DOCUMENTS

| | | | |
|---|---|---|---|
| CN | 116827798 A | * | 9/2023 |
| WO | WO2017035199 A1 | | 3/2017 |

OTHER PUBLICATIONS

Search Report and Written Opinon for International Application No. PCT/US2024/049158, Dated Jan. 28, 2025, 13 pages.

(Continued)

*Primary Examiner* — Oscar A Louie
*Assistant Examiner* — John Fan
(74) *Attorney, Agent, or Firm* — Lee & Hayes, P.C.

(57)          ABSTRACT

A system and a method for observable configuration delivery include, for each target tenants of a plurality of target tenants, determining a corresponding last unicast configuration change request (CCR) received; determining a number of previously unbooked unicast CCRs for the plurality of target tenants, a previously unbooked unicast CCR being a last unicast CCR received that has not been booked into a distribution to be submitted to a headend service (HES); booking the previously unbooked unicast CCRs into one or more distributions based on the number of the previously unbooked unicast CCRs and a configured capacity of each distribution of the one or more distributions; and sending the one or more distributions to the HES for sending the booked previously unbooked unicast CCRs to the plurality of target tenants.

20 Claims, 6 Drawing Sheets

(56) References Cited

U.S. PATENT DOCUMENTS

| | | | |
|---|---|---|---|
| 2003/0093530 A1 | 5/2003 | Syed | |
| 2015/0058343 A1 | 2/2015 | Kucera | |
| 2019/0349248 A1* | 11/2019 | Brown | H04L 41/082 |
| 2021/0064389 A1* | 3/2021 | Ackermann | G06F 9/30145 |
| 2021/0105278 A1* | 4/2021 | Gupta | G06F 21/6218 |
| 2021/0382711 A1* | 12/2021 | Look | G06F 21/53 |
| 2021/0400115 A1 | 12/2021 | Kuchibhotla et al. | |
| 2022/0311663 A1 | 9/2022 | Brown | |
| 2024/0031229 A1* | 1/2024 | Palavalli | H04L 41/5054 |
| 2025/0193075 A1 | 6/2025 | Edwards | |

OTHER PUBLICATIONS

Abdel et al., "A Predictive Mutil-Tenant Database Migration and Replication in the Cloud Environment", IEEE Access, vol. 9, Jan. 2021.

Alquraan et al., "An Analysis of Nettwork—Partitioning Failures in Cloud Systems", 13th USENIX Symposium on Operating Systems Design and Implementation, Oct. 7, 2018.

ETSI, "Experiential Networked Intelligence (ENI); System Architecture", retrieved at <<URL:ftp://docbox.etsi.org/ISF/ENI/05-Contributions/2021/ENI (21)000_080_Draft_-_RGS_ENI-0016_Sys_Architecture_v2_0_25_GS_ENI_005_.zipENI-0016_Sys_Architecturev2025.zipupdate-for-draft-2.0.25-CLEAN.docx>>, European Telecommunications Standards Institute, vol. ISG, No. 2.0.25, Apr. 23, 2021, pp. 1-163.

Search Report and Written Opinion for International Application No. PCT/US24/49157, Dated Jan. 7, 2025, 16 pages.

* cited by examiner

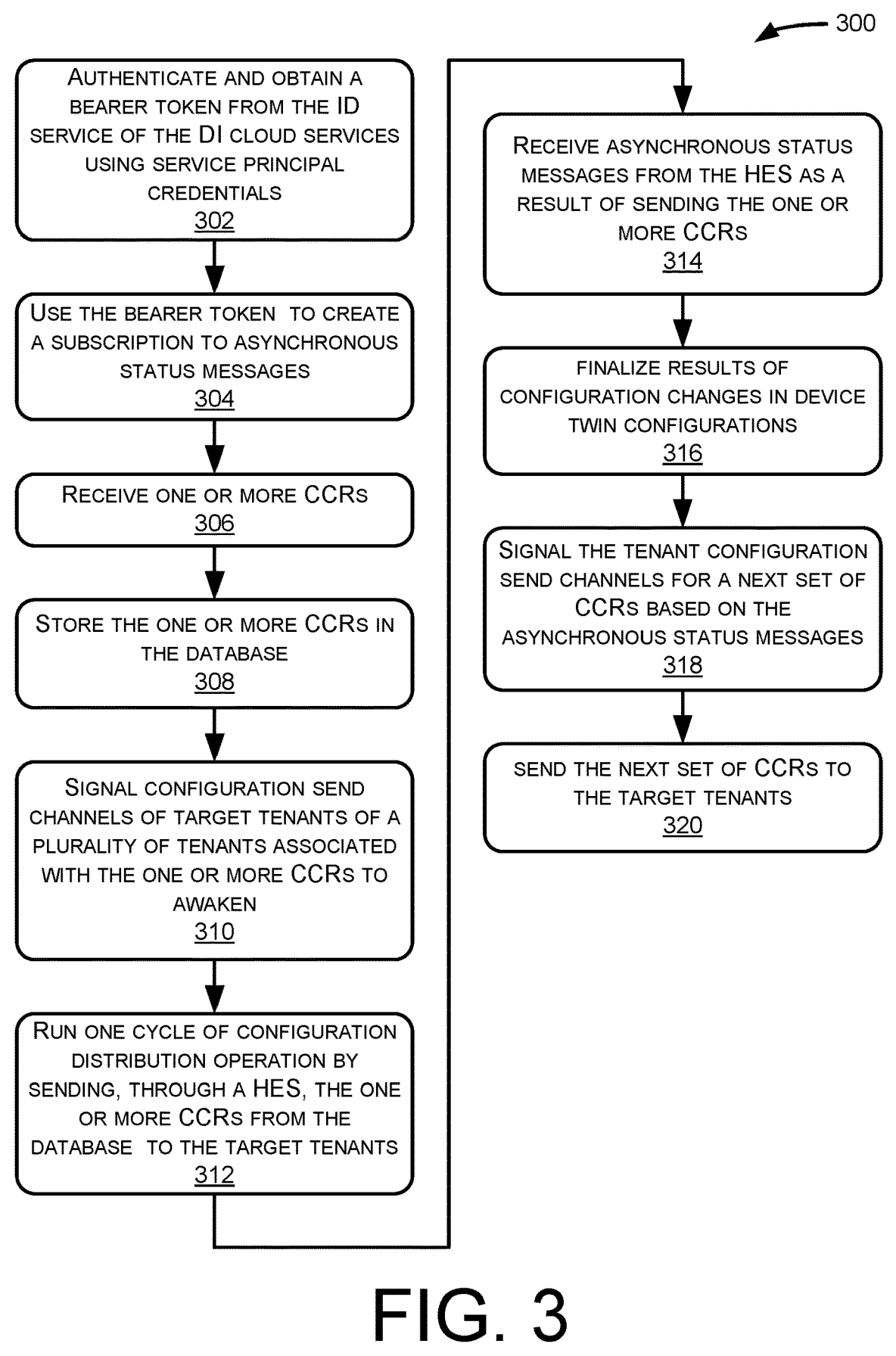

300

AUTHENTICATE AND OBTAIN A
BEARER TOKEN FROM THE ID
SERVICE OF THE DI CLOUD SERVICES
USING SERVICE PRINCIPAL
CREDENTIALS
302

USE THE BEARER TOKEN TO CREATE
A SUBSCRIPTION TO ASYNCHRONOUS
STATUS MESSAGES
304

RECEIVE ONE OR MORE CCRS
306

STORE THE ONE OR MORE CCRS IN
THE DATABASE
308

SIGNAL CONFIGURATION SEND
CHANNELS OF TARGET TENANTS OF A
PLURALITY OF TENANTS ASSOCIATED
WITH THE ONE OR MORE CCRS TO
AWAKEN
310

RUN ONE CYCLE OF CONFIGURATION
DISTRIBUTION OPERATION BY
SENDING, THROUGH A HES, THE ONE
OR MORE CCRS FROM THE
DATABASE TO THE TARGET TENANTS
312

RECEIVE ASYNCHRONOUS STATUS
MESSAGES FROM THE HES AS A
RESULT OF SENDING THE ONE OR
MORE CCRS
314

FINALIZE RESULTS OF
CONFIGURATION CHANGES IN DEVICE
TWIN CONFIGURATIONS
316

SIGNAL THE TENANT CONFIGURATION
SEND CHANNELS FOR A NEXT SET OF
CCRS BASED ON THE
ASYNCHRONOUS STATUS MESSAGES
318

SEND THE NEXT SET OF CCRS TO
THE TARGET TENANTS
320

FIG. 3

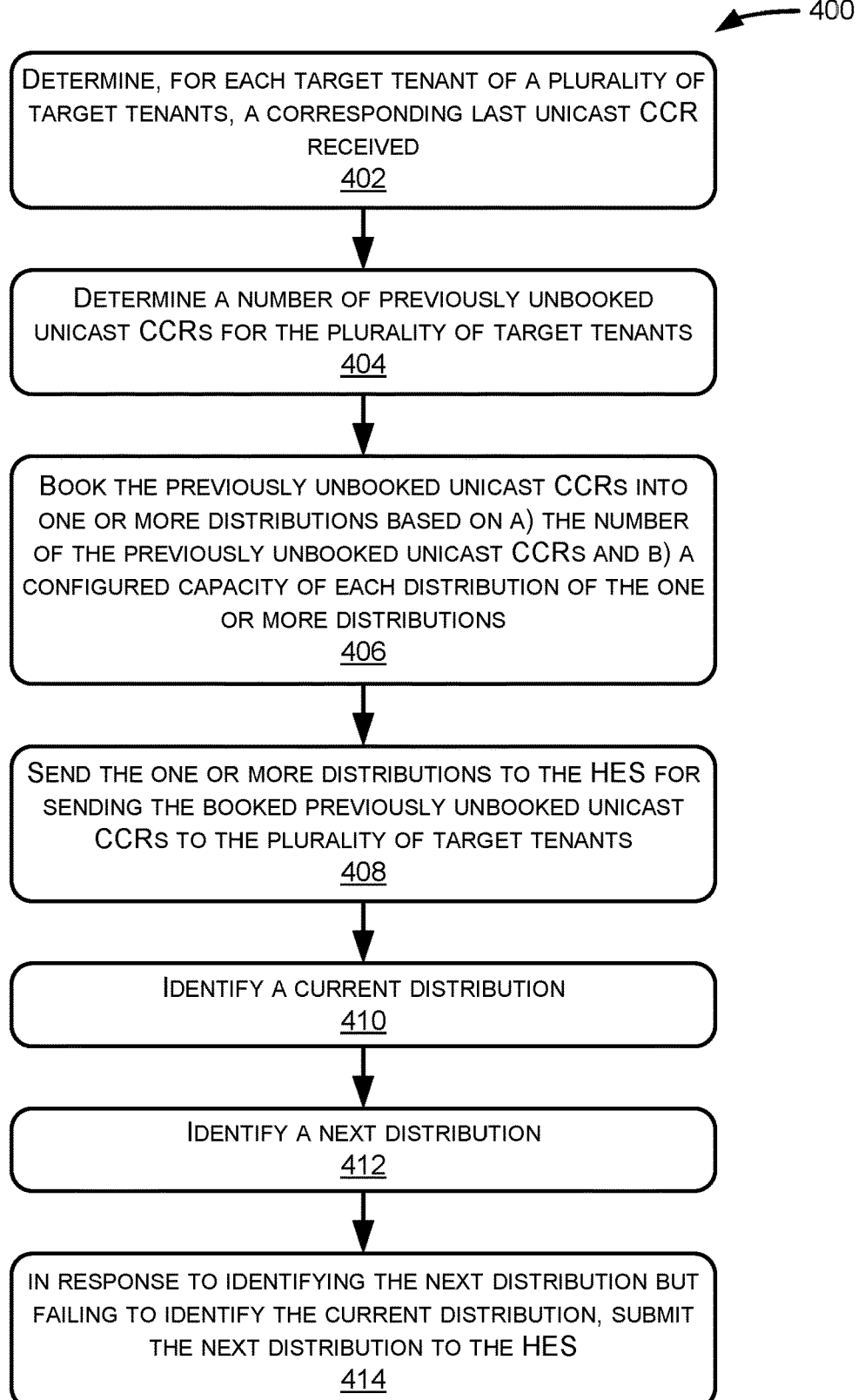

400

DETERMINE, FOR EACH TARGET TENANT OF A PLURALITY OF TARGET TENANTS, A CORRESPONDING LAST UNICAST CCR RECEIVED
402

DETERMINE A NUMBER OF PREVIOUSLY UNBOOKED UNICAST CCRS FOR THE PLURALITY OF TARGET TENANTS
404

BOOK THE PREVIOUSLY UNBOOKED UNICAST CCRS INTO ONE OR MORE DISTRIBUTIONS BASED ON A) THE NUMBER OF THE PREVIOUSLY UNBOOKED UNICAST CCRS AND B) A CONFIGURED CAPACITY OF EACH DISTRIBUTION OF THE ONE OR MORE DISTRIBUTIONS
406

SEND THE ONE OR MORE DISTRIBUTIONS TO THE HES FOR SENDING THE BOOKED PREVIOUSLY UNBOOKED UNICAST CCRS TO THE PLURALITY OF TARGET TENANTS
408

IDENTIFY A CURRENT DISTRIBUTION
410

IDENTIFY A NEXT DISTRIBUTION
412

IN RESPONSE TO IDENTIFYING THE NEXT DISTRIBUTION BUT FAILING TO IDENTIFY THE CURRENT DISTRIBUTION, SUBMIT THE NEXT DISTRIBUTION TO THE HES
414

FIG. 4

OBSERVABLE FEATURE CONFIGURATION DELIVERY

RELATED APPLICATION

This patent application claims benefit of priority to U.S. provisional patent application Ser. No. 63/606,879, titled "OBSERVABLE FEATURE CONFIGURATION DELIVERY", filed on Dec. 6, 2023, which is incorporated herein by reference.

TECHNICAL FIELD

The present disclosure generally relates to the field of delivering configuration parameters to multiple devices over the air (OTA), and more specifically to a system and method for managing regularly occurring and spikes in traffic for delivering configuration parameters to multiple devices.

BACKGROUND

Networked computing devices (e.g., endpoint (or node) devices, head-end devices, etc.) may contain and run one or more applications, and/or may run one or more features (e.g., applets) or agents (e.g., a plurality of features) that are associated with one or more primary applications that may be run on one or more networked host devices (e.g., an application server that may be in communication with endpoint devices and/or head-end devices over a network such as the Internet). Networked computing devices may run a single application or a plurality of applications (or may run one or more agents or features associated with a single primary application or a plurality of primary applications). For proper operation of the application(s) (or associated agent(s)/feature(s)), the endpoint devices need to be configured with configuration settings or parameters respectively associated with the application(s) (or associated primary applications, if applicable). The configuration settings may be adjustable or updateable. The delivery of configuration parameters to these endpoint devices, including configuration parameter updates, may be accomplished over the network, for example, over the air (OTA).

While unicast messaging the needed configuration parameters (and/or updates) to each endpoint device allows delivery of unique parameters to each endpoint device, sending configuration parameters in individual transmissions to each endpoint device is costly and inefficient. Multicasting the identical configuration parameters/updates to multiple endpoint devices may reduce network bandwidth consumption. However, one or more endpoint devices may require different configurations than other endpoint devices, even those using the same application(s), agent(s), or feature(s).

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

FIG. 3 illustrates an example process of publishing and observing CCRs.

FIG. 4 illustrates an example process of booking CCRs in a distribution.

DETAILED DESCRIPTION

Systems and methods for prioritized and serialized configuration updates for endpoint devices are provided. The prioritized and serialized configuration updates are scheduled to be efficiently implemented without overwhelming a given service at premises of a tenant or a customer, where an endpoint device is performing ongoing and critical tasks. The configuration updates may include 1) batches of unicast sends, in which a configuration for each endpoint may be different from others, and/or 2) spikes, i.e., sudden and/or unexpected increases, in the configuration updates, such as a full population updates of the endpoints numbering in the millions.

While the previous process for sending automated batches of unicast configurations supported regularly occurring daily traffic, it was not able to handle the spikes of updates well. The systems and methods described herein are directed to addressing one or more of the drawbacks set forth above by orchestrating over a hybrid network (central cloud distributing via a cloud server to an on-premises head end service), which is able to support 1) a hierarchical configuration, such as layering of default, global, group, and endpoint specific configuration, 2) requesting changes to subsets of parameters without requiring all parameters to be provided, 3) pre-composing of layers and changes to facilitate backwards compatibility in systems that do not yet support hierarchical configuration or parameter subset changes, and 4) explicitly prioritized scheduling but falls back to sensible implicit prioritization to ensure fair delivery across multiple publisher interests.

Figure 1:
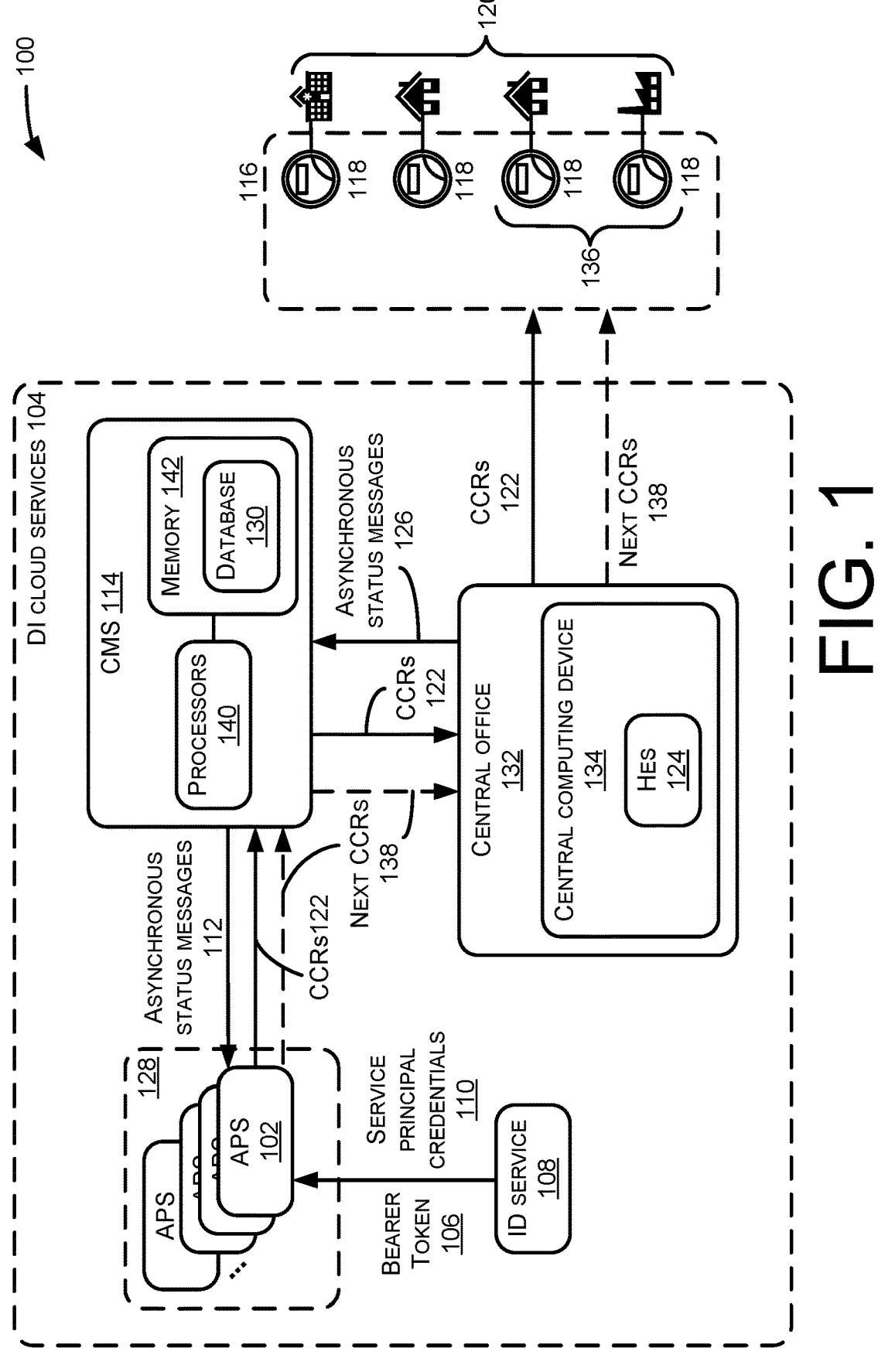
FIG. 1 illustrates an example schematic operation diagram of an observable feature configuration delivery system for publishing and observing configuration change requests (CCRs).

FIG. 1 illustrates an example schematic operation diagram 100 of an observable feature configuration delivery system for publishing and observing configuration change requests (CCRs). An automated publisher service (APS) 102 of distributed intelligence (DI) cloud services 104 may authenticate and obtain a bearer token 106 from an identity (ID) service 108 of the DI cloud services 104 using service principal credentials 110, i.e., the credentials of the APS 102, where the APS 102 is a principal that needs, and can be granted, access to resources. The ID service 108 may be a component in the DI cloud services 104 and may provide authentication and authorization of users and services to perform operations within overall solutions of the DI cloud services 104. The APS 102 may then use the bearer token 106 to create a subscription to asynchronous status messages 112 from a configuration management service (CMS) 114 of the DI cloud services 104. The asynchronous status messages 112 indicate a status of overall operations including whether a plurality of endpoint devices 116, such as utility meters 118 on premises and/or businesses 120, successfully received and fulfilled feature configuration changes associated with configuration change requests (CCRs) 122 when the CCRs 122 are sent to the plurality of endpoint devices 116. The feature configuration changes are changes to DI edge applications that run on the plurality of endpoint devices 116. For example, the CMS 114 may push location awareness (LA) configurations to LA applications running on the utility meters 118. The CMS 114, under a separate subscription with a headend service (HES) 124, may receive asynchronous status messages 126 associated with the CCRs 122 indicating successful, or failed, fulfilment of one or more of the CCRs 122 by the plurality of endpoint devices 116 (or individual ones of the endpoint devices 116) in response to sending the CCRs 122 to the plurality of endpoint devices 116, and provide the asynchronous status messages 112 to the APS 102 according to the subscription with the APS 102.

Figure 2:
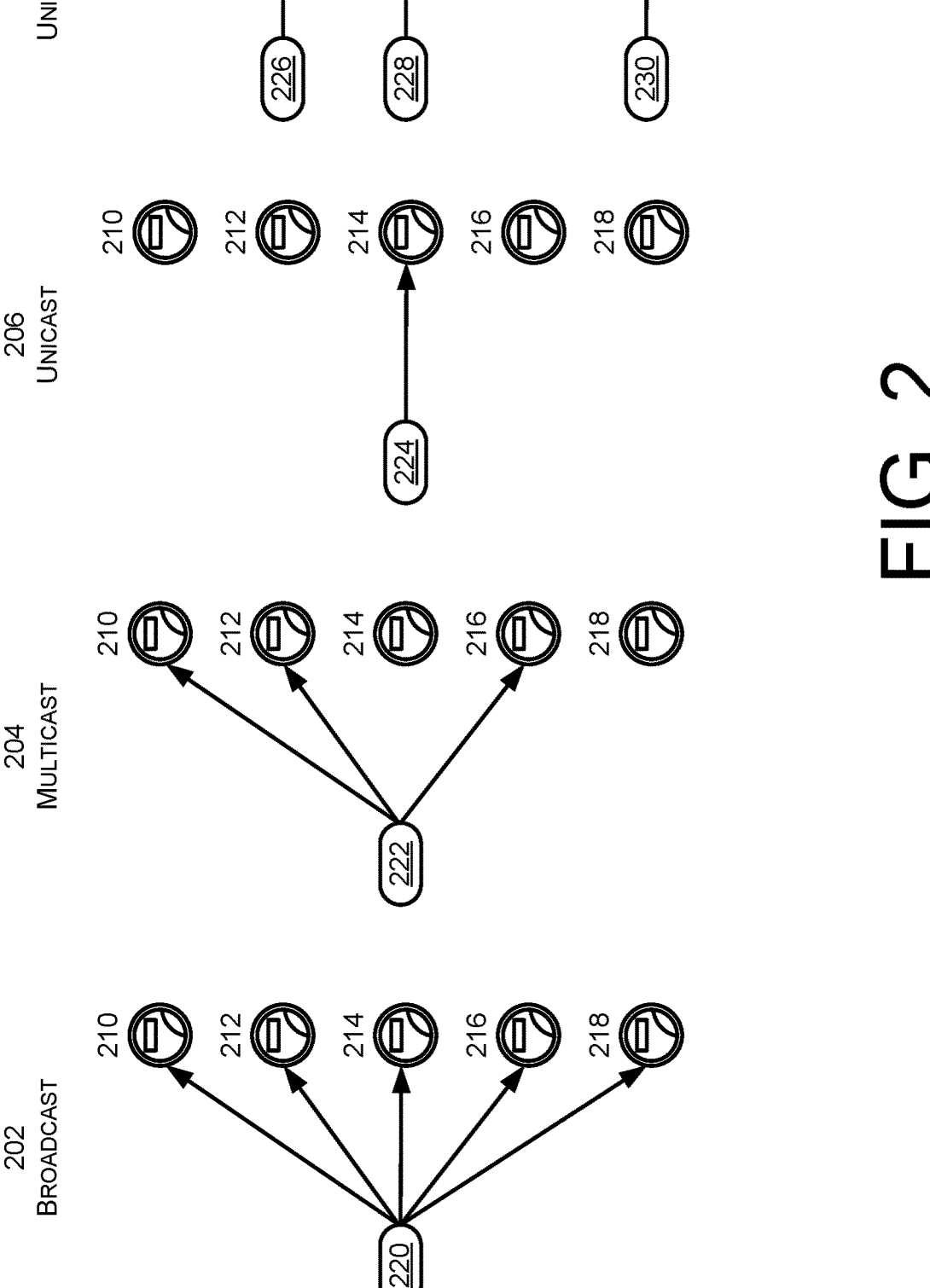
FIG. 2 illustrates example distribution techniques.

The APS 102 may be one of a plurality of APSs 128, and each APS of the plurality of APSs 128 is able to submit one or more CCRs, such as the CCRs 122, to the CMS 114, and the CMS 114 may capture the CCRs 122 in a database 130 of the CMS 114. In other words, the CMS 114 may receive the CCRs 122 from the plurality of APSs 128 and store the CCRs 122 in the database 130 of the CMS 114. The CMS 114 may then, at appropriate points in time, signal configuration send channels of target tenants, or target endpoint devices of customers, such as the plurality of endpoint devices 116, i.e., tenants of endpoint devices targeted for, or associated with, the CCRs 122, to awaken. A "tenant" may be used to interchangeably refer to a customer and an endpoint device of a customer. The CMS 114 may run one cycle of configuration distribution operation by sending, through the HES 124, such as a central office 132 hosting one or more central computing devices 134, the one or more CCRs from the database 130 to the target tenants. The CMS 114 may send the one or more CCRs utilizing at least one of: 1) broadcasting, i.e., sending the same CCR, or the same set of CCRs, to the plurality of endpoint devices 116, 2) multicasting, i.e., sending the same CCR, or the same set of CCRs, to some endpoint devices 136 selected from the plurality of endpoint devices 116, 3) unicasting, i.e., sending one or more CCR to one endpoint device at a time, or 4) unicast batch, i.e., receiving batches of unicast CCRs in a single request for efficiency. For the unicast batch, the CMS 114 may also receive from the APS 102 tenant operation context information corresponding to each unicast of the unicast batch including a corresponding target tenant and a corresponding operation identification (ID), and an expected number of unicast changes within multiple unicasts of the unicast batch when there are multiple batches expected or required and sending the multiple unicasts. For example, the APS 102 may send unicast CCRs to one million endpoint devices 116 as part of a big operation. The unicast CCRs may go out in batches, i.e., distributions, to the HES 124 and status of each batch may come back to the CMS 114. The CMS 114 may report on the overall operation of one million endpoint devices 116 back to the APS 102 via the asynchronous status messages 112. Schematic examples of broadcast, multicast, unicast, and unicast batch are illustrated in FIG. 2, which is described in detail below.

The CMS 114 may continue running internally scheduled tasks on a regular interval. For example, the CMS 114 may send any configuration parameters or other data and/or information available at scheduled times to some or all of the plurality of endpoint devices 116 or may send the configuration parameters or other data and/or information when a batch is full, such as 5,000 CCRs per batch. The CMS 114 may additionally signal the configuration send channels of the target tenants with in-flight configurations, which provide the configuration send channels of the target tenants with ability to initiate one or more additional cycles sufficient in number responsive to new CCRs being received.

The configuration distribution operation is completed when the HES 124 acknowledges 1) the fulfilment of the CCRs by the target tenant, or 2) the failure to fulfill the CCRs by the target tenant including failing to receive one or more CCRs, by sending the asynchronous status messages 126 to the CMS 114, thus enabling the CMS 114 to observe the status of the feature configuration, and provide the asynchronous status messages 112 to the APS 102. In response to receiving the asynchronous status messages 126, the CMS 114 may finalize results of configuration changes in device twin configurations, which store configuration details needed for the correct calculation of a next set of CCRs 138 and maintain the state of CMS 114 regarding the configuration of each endpoint device 116 for all DI features on the endpoint device 116. The CMS 114 may then signal the configuration send channels of the target tenants for the next set of CCRs 138 (shown with dotted lines), and send the next set of CCRs 138 to the target tenants. The next set of CCRs 138 may include at least one of 1) one or more new CCRs targeted for one or more endpoint devices 136 of the plurality of endpoint devices 116, or 2) one or more CCRs of the previous CCRs 122 targeted for one or more endpoint devices 136 of the plurality of endpoint devices 116. Based on the characteristics of the new set of the CCRs 138 as described above, the CMS 114 may send the new set of the CCRs 138 by one or more of the broadcast, multicast, unicast, and unicast batch as described above.

Additionally, the CMS 114 may include one or more processors (processors) 140 and memory 142 coupled to the processors 140. The memory 142 may include the database 130, and may store computer-executable instructions that, when executed by the processors 140, cause the processors 140 to perform operations described above with reference to FIG. 1.

FIG. 2 illustrates example distribution techniques including broadcast 202, multicast 204, unicast 206, and unicast batch 208. In this example, five target tenants, such as utility meters 210, 212, 214, 216, and 218, are shown. Under the broadcast 202, a message 220 is sent to all utility meters 210-218 in a single transmission, which is particularly useful when all devices require the same message. Broadcasting, however, cannot send the message targeted only to a subset of devices. Under the multicast 204, a message 222 is sent to some utility meters, such as utility meters 210, 212, and 216, from utility meters 210-218 in a single transmission. While multicasting cannot target all devices like broadcasting, multicasting can send the same message to a selected subset of devices from all the devices. Under the unicast 206, a message 224 is sent to a single utility meter, such as the utility meter 214 in a single transmission. Unicasting allows a unique message to each target device. However, because one message is sent to a target device at a time, it is not an efficient method when sending different individual messages to a large number of devices one at a time. Under the unicast batch 208, batches of unicast messages are received in a single request for efficiency instead of sending an individual message as it is received one at a time. In this example, three unicast messages 226, 228, and 230 are shown to be transmitted to the utility meters 212, 214, and 218, respectively.

FIG. 3 illustrates an example process 300 of publishing and observing CCRs 122. At block 302, an automated publisher service (APS), such as the APS 102 of the DI cloud services 104, may authenticate and obtain a bearer token 106 from an identity (ID) service 108 of the DI cloud services 104 using service principal credentials 110. As described above with reference to FIG. 1, the ID service 108 may be a component in the DI cloud services 104 and may provide authentication and authorization of users and services to perform operations within overall solutions of the DI cloud services 104. At block 304, the APS 102 may then use the bearer token 106 to create a subscription to asynchronous status messages 112 from the CMS 114. The asynchronous status messages 112 indicate a status of overall operations including whether a plurality of endpoint devices 116, such as utility meters 118 on premises and/or businesses 120 as shown above with reference to FIG. 1, successfully received and fulfilled feature configuration changes associated with CCRs 122 when the CCRs 122 are sent to the plurality of endpoint devices 116. The feature configuration changes are changes to DI edge applications that run on the plurality of endpoint devices 116. For example, the CMS 114 may push location awareness (LA) configurations to LA applications running on the utility meters 118. The CMS 114, under a separate subscription with a headend service (HES) 124, may receive the asynchronous status messages 126 associated with the CCRs 122 indicating successful, or failed, fulfilment of one or more of the CCRs 122 by the plurality of endpoint devices 116 (or individual ones od the endpoint devices 116) in response to sending the CCRs 122 to the plurality of endpoint devices 116, and provide the asynchronous status messages 112 to the APS 102 according to the subscription with the APS 102.

The APS 102 may be one of a plurality of APSs 128, and each APS of the plurality of APSs 128 is able to submit one or more CCRs, such as the CCRs 122, to the CMS 114. At block 306, the CMS 114 may receive the CCRs 122 from the plurality of APSs 128, and capture, or store, the CCRs 122 in the database 130 of the CMS 114 at block 308. At block 310, the CMS 114 may then, at appropriate points in time, signal configuration send channels of target tenants, or target endpoint devices of customers, such as the plurality of endpoint devices 116, i.e., tenants of endpoint devices targeted for, or associated with, the CCRs 122, to awaken. A "tenant" may be used to interchangeably refer to a customer and an endpoint device of a customer.

At block 312, the CMS 114 may run one cycle of configuration distribution operation by sending, through the HES 124, such as a central office 132 hosting one or more central computing devices 134, the one or more CCRs from the database 130 to the target tenants as described above with reference to FIG. 1. The CMS 114 may send the one or more CCRs utilizing at least one of: 1) broadcasting, i.e., sending the same CCR, or the same set of CCRs, to the plurality of endpoint devices 116, 2) multicasting, i.e., sending the same CCR, or the same set of CCRs, to some endpoint devices 136 selected from the plurality of endpoint devices 116, 3) unicasting, i.e., sending one or more CCR to one endpoint device at a time, or 4) unicast batch, i.e., receiving batches of unicast CCRs in a single request for efficiency. For the unicast batch, the CMS 114 may also receive from the APS 102 tenant operation context information corresponding to each unicast of the unicast batch including a corresponding target tenant and a corresponding operation identification (ID), and an expected number of unicast changes within multiple unicasts of the unicast batch when there are multiple batches expected or required and sending the multiple unicasts. Schematic examples of broadcast, multicast, unicast, and unicast batch are illustrated in FIG. 2.

The CMS 114 may continue running internally scheduled tasks on a regular interval. For example, the CMS 114 may send any configuration parameters or other data and/or information available at scheduled times to some or all of the plurality of endpoint devices 116 or may send the configuration parameters or other data and/or information when a batch is full, such as 5,000 CCRs per batch. The CMS 114 may additionally signal the configuration send channels of the target tenants with in-flight configurations, which provide the configuration send channels of the target tenants with ability to initiate one or more additional cycles sufficient in number responsive to new CCRs being received.

The configuration distribution operation is completed when the HES 124 acknowledges 1) the fulfillment of the CCRs by the target tenant, or 2) the failure to fulfill the CCRs by the target tenant including failing to receive one or more CCRs, by sending the asynchronous status messages 126 to the CMS 114, thus enabling the CMS 114 to observe the status of the feature configuration, and provide the asynchronous status messages 112 to the APS 102. In response to receiving the asynchronous status messages 126 at block 314, the CMS 114 may finalize results of configuration changes in device twin configurations, which store configuration details needed for the correct calculation of a next set of CCRs 138 and maintain the state of CMS 114 regarding the configuration of each endpoint device 116 for all DI features on the endpoint device 116, at block 316. The CMS 114 may then signal the configuration send channels of the target tenants for the next set of CCRs 138 at block 318, and send the next set of CCRs 138 to the target tenants. The next set of CCRs 138 may include at least one of 1) one or more new CCRs targeted for one or more endpoint devices 136 of the plurality of endpoint devices 116, or 2) one or more CCRs of the previous CCRs 122 targeted for one or more endpoint devices 136 of the plurality of endpoint devices 116. Based on the characteristics of the new set of the CCRs 138 as described above, the CMS 114 may, at block 320, send the new set of the CCRs 138 by one or more of the broadcast, multicast, unicast, and unicast batch as described above. As described above with reference to FIG. 1, the CMS 114 may include the processors 140 and memory 142 coupled to the processors 140. The memory 142 may store computer-executable instructions that, when executed by the processors 140, cause the processors 140 to perform operations described above with reference to FIG. 3.

FIG. 4 illustrates an example process 400 of booking CCRs in a distribution. The CMS 114, as described above with reference to FIG. 1, may perform the process 400.

At block 402, the CMS 114 may determine, for each target tenants of a plurality of target tenants, such as the plurality of endpoint devices 116, a corresponding last unicast CCR received. The CMS 114 may determine an operation identification (ID) of the corresponding last unicast CCR and set a boundary, based on the operation ID, for refraining from booking a CCR arriving after the boundary into a distribution. At block 404, the CMS 114 may determine a number of previously unbooked unicast CCRs for the plurality of target tenants at block 404, where a previously unbooked unicast CCR is a last unicast CCR received, which has not been booked into a distribution to be submitted to a headend service, such as the HES 124.

At block 406, the CMS 114 may book the previously unbooked unicast CCRs into one or more distributions based on a) the number of the previously unbooked unicast CCRs and b) a configured capacity of each distribution of the one or more distributions. For example, if there were 15,200 previously unbooked CCRs, and the configured capacity of each distribution were 5,000, then the CMS 114 would book the 15,200 previously unbooked CCRs into four distributions with three full distributions each having 5,000 previously unbooked CCRs booked and one under-full distribution having 200 previously unbooked CCRs booked. The CMS 114 may create an under-full distribution associated with the distributions when the number of previously unbooked CCRs to be booked is less than the configured capacity, which is 5,000 in this example. The CMS 114 may send the under-full distribution to the HES 124 if configuration send channels of the plurality of target tenants, such as the plurality of endpoint devices 116, includes no in-flight distributions, or the under-full distribution is known to be a last remaining portion of the one or more distribution. An in-flight distribution is a configuration job still running in, and distributing changes to, endpoint devices. Additional distributions are held back, i.e., refrained from being sent, until a current configuration job (in-flight distribution) has finished.

At block 408, the CMS 114 may send the one or more distributions to the HES 124 for sending the booked previously unbooked unicast CCRs to the plurality of target tenants. At block 410, the CMS 114 may identify a current distribution, which is a distribution submitted to the HES 124 and unconfirmed for completion. The unconfirmed for completion regarding the current distribution includes at least one of failing to receive from the HES 124 asynchronous status messages, such as the asynchronous status messages 112, as described above with reference to FIGS. 1 and 3, associated with the current distribution, or failing to meet a predetermined policy condition associated with the current distribution. The predetermined policy condition is intended to fail stuck if distributions that do not show sufficient liveness. That is, the policy may be a piece of code (policy routine) that runs on a schedule and requires that the CMS 114 has, for an in-flight, or ongoing distribution, two conditions satisfied: 1) the receiver liveness check—the CMS 114 has received an asynchronous status message 126 for the distribution from the HES 124 within a first configured time interval, such as one hour, and 2) the state liveness check -the data, or state, of the distribution has been materially updated within a second configured time interval, such as four hours. If a distribution fails either the receiver liveness check or the state liveness check, then the distribution may be marked as both completed and as a failure by the policy routine running in the CMS 114 regardless of if the actual job in the HES 124 has crashed, hung, or unresponsive, or is still ongoing but has failed to meaningfully update the CMS 114 via an asynchronous status message 126.

For example, if a distribution is running and the HES 124 experiences a network issue and cannot send a new asynchronous status message 126 for two hours, then that distribution, from the perspective of the CMS 114, will fail the status liveness check after one hour, and the policy will complete the distribution as a failure. If the network issue is resolved in a half hour, and the asynchronous status messages 126 resume, then the job would not be failed. If a distribution is running and asynchronous status messages 126 are being regularly received every five minutes for 4.5 hours, but the completion counts have, in every received asynchronous message, indicated that exactly 100 endpoint devices 116 have completed and this number did not change in the received asynchronous messages 126, then that distribution will fail the state liveness check after 4 hours because the job has not materially progressed in that time frame, and the policy will complete the distribution as a failure. Here, the network connectivity is fine, but the job is still likely hung, unresponsive, in the HES 124. If, however, after 3.5 hours, the count of completed endpoint device moves to 101, one more than the previous count, then the job would not be failed by policy, because there is evidence that it is again progressing.

At block 412, the CMS 114 may identify a next distribution based, at least in part, on 1) priority of candidate operations associated with a next set of CCRs, 2) priority of candidate distributions booked with the next set of CCRs, and 3) a wait time of booked unicast CCRs for a unicast batch distribution.

The priority of candidate operations may be based on the priority of configuration operations associated with the candidate operations. For example, broadcast configuration operations including global configuration changes may be prioritized over unicast batches, because the endpoint specific unicast configuration changes would depend on, and/or be composed with, the global configuration changes. Therefore, the global change operations need to be scheduled first, especially for cases in which configuration has to be pre-composed on the cloud server side as described above. The priority may also be application specific. For example, if a first application and a second application both have configuration, but the first application needs a more real-time, i.e., faster, change, then the configuration operations of the first application may be allowed to be prioritized over the configuration operations of the second, i.e., a slower moving, application.

The priority of candidate distributions may be based on a sequence of distributions that needs to be followed for successful fulfilment of the distributions for the target endpoint devices. For example, for an install-time configuration operation to ensure that newly installed and/or upgraded endpoints get both a global configuration and any unicast endpoint-specific configuration via unicast batch distribution as part of a single installation process, the global broadcast distribution for the global configuration needs to be prioritized over the unicast batch distributions that would be needed to correctly configure all endpoints in the population.

The CMS 114 may identify the next distribution that does not have CCRs assigned or booked, and proposing a new configured capacity for the next distribution, for example, 3,000 instead of 5,000 as previously configured. If the CMS 114 determines that the next distribution invalidates an existing distribution, which has existing CCRs booked but has not been submitted to the HES 124, the CMS 114 may clear the existing CCRs booked in the next distribution, and re-propose the existing distribution by re-calculating proposed configuration that is prepared in advance while waiting for any in-flight, or ongoing, work to complete. At block 414, in response to identifying the next distribution but failing to identify the current distribution, the CMS 114 may submit the next distribution to the HES 124.

As described above with reference to FIG. 1, the CMS 114 may include the processors 140 and memory 142 coupled to the processors 140. The memory 142 may store computer-executable instructions that, when executed by the processors 140, cause the processors 140 to perform operations described above with reference to FIG. 4.

Figure 5:
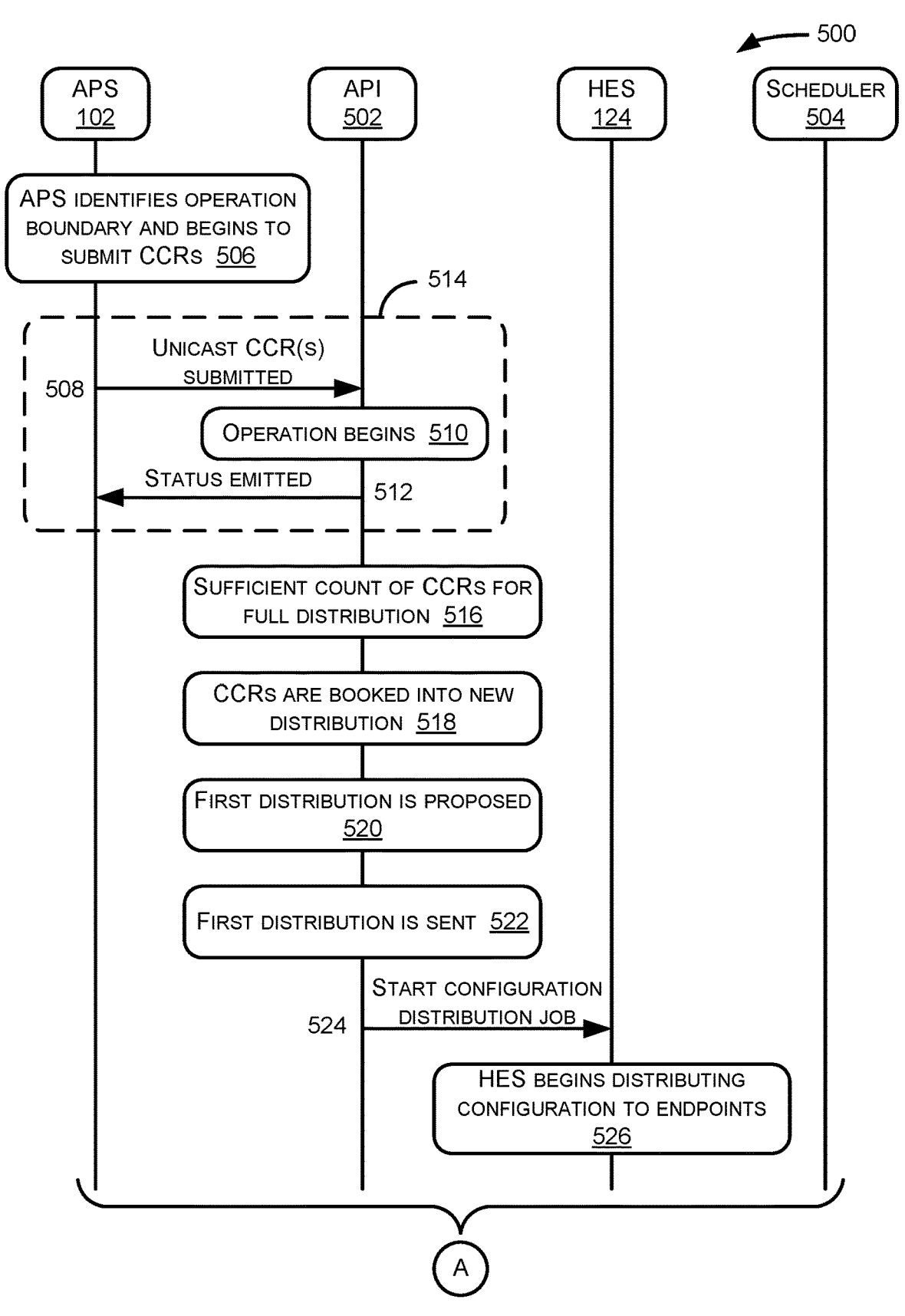
FIG. 5 illustrates a first portion of an example timing diagram for processing CCRs for a distribution.
Figure 6:
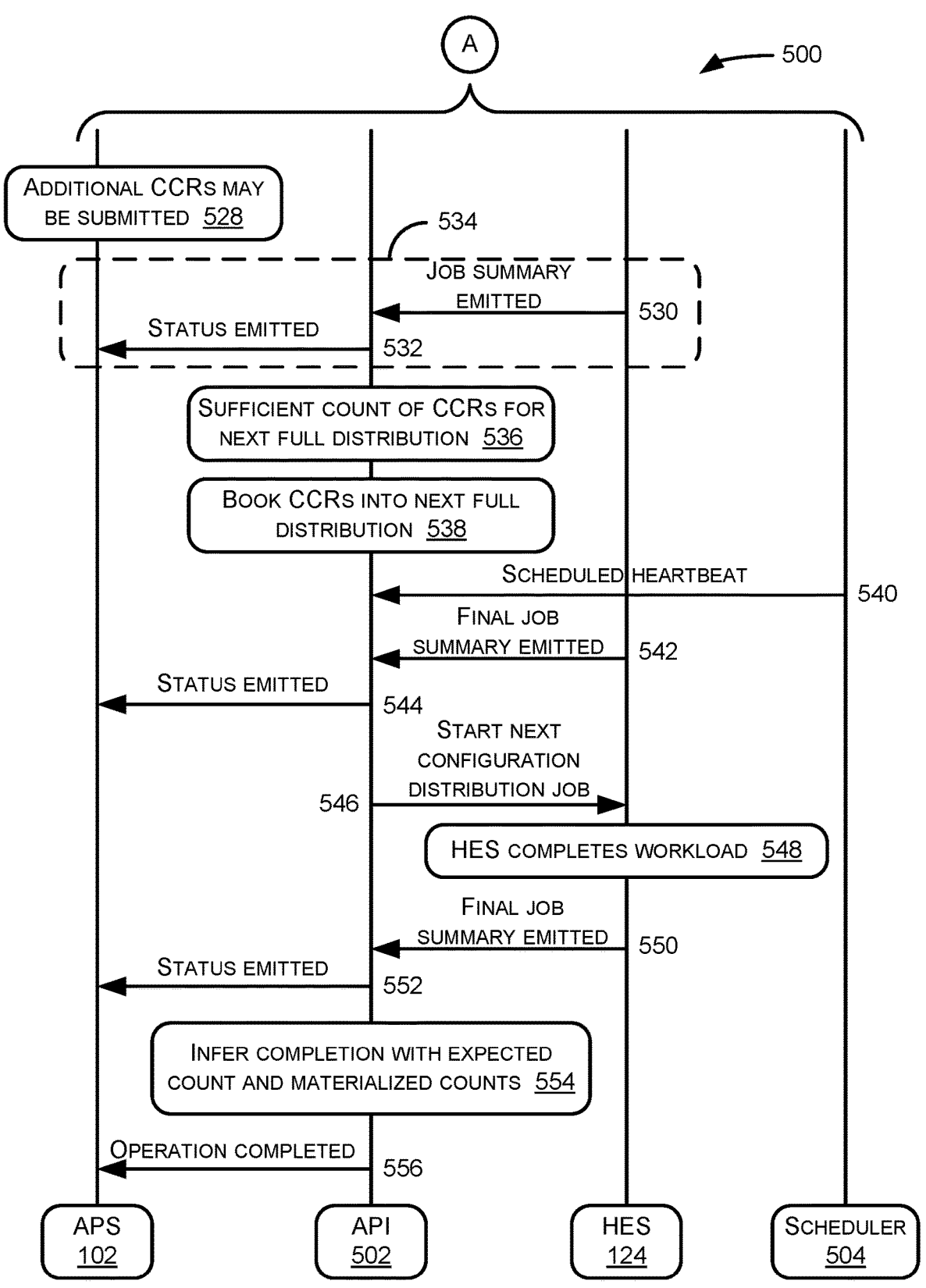
FIG. 6 illustrates a second portion of the example timing diagram for processing the CCRs for the distribution.

FIGS. 5 and 6 illustrate a first portion and a second portion, respectively, of an example timing diagram 500 involving the APS 102, an application programming interface (API) 502, the HES 124, and a scheduler 504 for processing CCRs for a distribution. The API 502 and the scheduler 504 may be components of the CMS 114 and coupled to the processors 140.

Referring to FIG. 5, at step 506, the APS 102 may identify operation boundary, separating the previous operation and the current operation, and begin submitting CCRs 122 to the API 502. For example, the APS 102 may submit one or more unicast CCRs to the API 502 at step 508, and the operation may begin in the API 502 at step 510. The API 502 may emit a status of the CCRs and/or a status of the operation to the APS 102 at step 512, forming a loop 514 of the CCR submission 508 and the status emission 512 until a sufficient count of the CCRs 122 for a full distribution is reached at step 516. The API 502 may book the CCRs 122 into a new distribution at step 518 and propose a first distribution at step 520. The API 502 may send the first distribution to the HES 124 at step 522 and instruct the HES 124 to start a configuration distribution job at step 524. In response, the HES 124 may begin distributing the configuration to one or more of the plurality of endpoint devices 116 at step 526.

Referring to FIG. 6, at step 528, the APS 102 may submit additional CCRs. For example, the APS 102 may submit one or more next CCRs 138 to the API 502. The HES 124 may emit a job summary regarding the configuration distribution to the endpoint devices 116 to the API 502 at step 530, and the API 502 may emit a status of the CCRs and/or the operation to the APS 102 at step 532, forming a loop 534 of the CCR submission 528, the job summary emission 530, and the status emission 532 until a sufficient count of the next CCRs 138 for a next full distribution is reached at step 536. The API 502 may book the next CCRs 138 into a next full distribution at step 538.

The scheduler 504 may send a scheduled heartbeat to the API 502 at step 540 and the HES 124 may send, or emit, a final summary to the API 502 at step 542. The API 502, in response, may send, or emit, a status of the first distribution to the APS 102 at step 544. At step 546, the API 502 may send instructions to the HES 124 to start a next configuration distribution, and the HES 124 may complete a workload at step 548. The HES 124 may send, or emit, a final job summary to the API 502 at step 550, and the API 502 may send, or emit, a status of the configuration distributions to the APS 102 at step 552. Based on the final job summary from the HES 124, the API 502 may infer completion of configuration distribution with an expected count and materialized count of CCRs at step 554, and may send a message of the operation completed to the APS 102 at step 556.

Some or all operations of the methods described above can be performed by execution of computer-readable instructions stored on a computer-readable storage medium, as defined below. The terms "computer-readable medium," "computer-readable instructions," and "computer executable instructions" as used in the description and claims, include routines, applications, application modules, program modules, programs, components, data structures, algorithms, and the like. Computer-readable and -executable instructions can be implemented on various system configurations, including single-processor or multiprocessor systems, minicomputers, mainframe computers, personal computers, hand-held computing devices, microprocessor-based, programmable consumer electronics, combinations thereof, and the like.

The computer-readable storage media may include volatile memory (such as random-access memory (RAM)) and/or non-volatile memory (such as read-only memory (ROM), flash memory, etc.). The computer-readable storage media may also include additional removable storage and/or non-removable storage including, but not limited to, flash memory, magnetic storage, optical storage, and/or tape storage that may provide non-volatile storage of computer-readable instructions, data structures, program modules, and the like.

A non-transitory computer-readable storage medium is an example of computer-readable media. Computer-readable media includes at least two types of computer-readable media, namely computer-readable storage media and communications media. Computer-readable storage media includes volatile and non-volatile, removable and non-removable media implemented in any process or technology for storage of information such as computer-readable instructions, data structures, program modules, or other data. Computer-readable storage media includes, but is not limited to, phase change memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanism. As defined herein, computer-readable storage media do not include communication media.

The computer-readable instructions stored on one or more non-transitory computer-readable storage media, when executed by one or more processors, may perform operations described above with reference to FIGS. 1-6. Generally, computer-readable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

Example Clauses

A. A method includes receiving one or more configuration change requests (CCRs); storing the one or more CCRs in a database; signaling configuration send channels of target tenants of a plurality of tenants associated with the one or more CCRs to awaken; sending the one or more CCRs from the database to the target tenants through a headend service (HES); receiving asynchronous status messages from the HES as a result of sending the one or more CCRs; signaling the configuration send channels for a next set of CCRs based on the asynchronous status messages; and sending the next set of CCRs to one or more tenants of the target tenants.

B. The method of example A, wherein receiving the one or more CCRs includes receiving the one or more CCRs from an automated publisher service (APS) of a distributed intelligence (DI) cloud service.

C. The method of example A, wherein sending the one or more CCRs from the database to the target tenants through the HES includes: sending the one or more CCRs by utilizing at least one of: a broadcast, a multicast, a unicast, or a unicast batch.

D. The method of example C, wherein sending the one or more CCRs by utilizing the unicast batch includes: 1) sending tenant operation context information corresponding to each unicast of the unicast batch including a corresponding target tenant and a corresponding operation identification (ID), and 2) sending an expected number of unicast changes within multiple unicasts of the unicast batch when there are multiple batches expected based on the one or more CCRs.

E. The method of example A, wherein the asynchronous status messages indicate at least one of: successful fulfillment of the one or more of the CCRs by one or more tenants of the target tenants, or failed fulfillment of the one or more of the CCRs by one or more tenants of the target tenants.

F. The method of example E further includes creating a subscription to the asynchronous status messages by authenticating a bearer token using service principal credentials of the bearer token, where the bearer token is obtained by an automated publisher service (APS) of a distributed intelligence (DI) cloud services.

G. The method of example A, wherein signaling the configuration send channels for the next set of CCRs includes signaling the configuration send channels with in-flight configurations, which enable the configuration send channels to initiate one or more additional cycles responsive to new CCRs being received.

H. The method of example A further includes finalizing results of configuration changes in device twin configurations, which store configuration details for calculating the next set of CCRs.

I. A system includes one or more processors and memory that is coupled to the one or more processors and stores thereon computer-executable instructions that, when executed by the one or more processors, cause the one or more processors to perform operations. The operations include receiving one or more configuration change requests (CCRs); storing the one or more CCRs in a database; signaling configuration send channels of target tenants of a plurality of tenants associated with the one or more CCRs to awaken; sending the one or more CCRs from the database to the target tenants through a headend service (HES); receiving asynchronous status messages from the HES as a result of sending the one or more CCRs; signaling the configuration send channels for a next set of CCRs based on the asynchronous status messages; and sending the next set of CCRs to one or more tenants of the target tenants.

J. The system of example I, wherein receiving the one or more CCRs includes receiving the one or more CCRs from an automated publisher service (APS) of a distributed intelligence (DI) cloud service.

K. The system of example I, wherein 1) sending the one or more CCRs from the database to the target tenants through the HES includes sending the one or more CCRs by utilizing at least one of: a broadcast, a multicast, a unicast, or a unicast batch; and 2) sending the one or more CCRs by utilizing the unicast batch includes: sending tenant operation context information corresponding to each unicast of the unicast batch including a corresponding target tenant and a corresponding operation identification (ID), and sending an expected number of unicast changes within multiple unicasts of the unicast batch when there are multiple batches expected based on the one or more CCRs.

L. The system of example I, wherein the asynchronous status messages indicate at least one of: successful fulfillment of the one or more of the CCRs by one or more tenants of the target tenants, or failed fulfillment of the one or more of the CCRs by one or more tenants of the target tenants; and the operations further include creating a subscription to the asynchronous status messages by authenticating a bearer token, obtained by an automated publisher service (APS) of a distributed intelligence (DI) cloud service, using service principal credentials of the bearer token.

M. The system of example I, wherein signaling the configuration send channels for the next set of CCRs includes signaling the configuration send channels with in-flight configurations, the in-flight configurations enabling the configuration send channels to initiate one or more additional cycles responsive to new CCRs being received.

N. The system of example I, wherein the operations further include finalizing results of configuration changes in device twin configurations, the device twin configurations storing configuration details for calculating the next set of CCRs.

O. A non-transitory computer-readable storage medium stores thereon computer-executable instructions that, when executed by one or more processors of a system, cause the one or more processors to perform operations. The operations include: receiving one or more configuration change requests (CCRs); storing the one or more CCRs in a database; signaling configuration send channels of target tenants of a plurality of tenants associated with the one or more CCRs to awaken; sending the one or more CCRs from the database to the target tenants through a headend service (HES); receiving asynchronous status messages from the HES as a result of sending the one or more CCRs; signaling the configuration send channels for a next set of CCRs based on the asynchronous status messages; and sending the next set of CCRs to one or more tenants of the target tenants.

P. The non-transitory computer-readable storage medium of example O, wherein receiving the one or more CCRs includes receiving the one or more CCRs from an automated publisher service (APS) of a distributed intelligence (DI) cloud service.

Q. The non-transitory computer-readable storage medium of example O, wherein: 1) sending the one or more CCRs from the database to the target tenants through the HES includes sending the one or more CCRs by utilizing at least one of: a broadcast, a multicast, a unicast, or a unicast batch; and 2) sending the one or more CCRs by utilizing the unicast batch includes: sending tenant operation context information corresponding to each unicast of the unicast batch including a corresponding target tenant and a corresponding operation identification (ID), and sending an expected number of unicast changes within multiple unicasts of the unicast batch when there are multiple batches expected based on the one or more CCRs.

R. The non-transitory computer-readable storage medium of example O, wherein: the asynchronous status messages indicate at least one of successful fulfillment of the one or more of the CCRs by one or more tenants of the target tenants, or failed fulfillment of the one or more of the CCRs by one or more tenants of the target tenants; and the operations further include creating a subscription to the asynchronous status messages by authenticating a bearer token, obtained by an automated publisher service (APS) of a distributed intelligence (DI) cloud service, using service principal credentials of the bearer token.

S. The non-transitory computer-readable storage medium of example O, wherein signaling the configuration send channels for the next set of CCRs includes signaling the configuration send channels with in-flight configurations, the in-flight configurations enabling the configuration send channels to initiate one or more additional cycles responsive to new CCRs being received.

T. The non-transitory computer-readable storage medium of example O, wherein the operations further include finalizing results of configuration changes in device twin configurations, the device twin configurations storing configuration details for calculating the next set of CCRs.

U. A method includes determining, for each target tenant of a plurality of target tenants, a corresponding last unicast configuration change request (CCR) received; determining a number of previously unbooked unicast CCRs for the plurality of target tenants, a previously unbooked unicast CCR being a last unicast CCR received that has not been booked into a distribution to be submitted to a headend service (HES); booking the previously unbooked unicast CCRs into one or more distributions based on the number of the previously unbooked unicast CCRs and a configured capacity of each distribution of the one or more distributions; and sending the one or more distributions to the HES for sending the booked previously unbooked unicast CCRs to the plurality of target tenants.

V. The method of example U, wherein determining, for each target tenant of the plurality of target tenants, the corresponding last unicast CCR received includes determining an operation identification (ID) of the corresponding last unicast CCR and setting a boundary, based on the operation ID, for refraining from booking a CCR arriving after the boundary into a distribution.

W. The method of example O further includes: 1) creating an under-full distribution associated with the one or more distributions, the under-full distribution being a distribution having a number of booked previously unbooked CCRs that is less than the configured capacity; and 2) sending the under-full distribution to the HES responsive to at least one of: configuration send channels of the plurality of target tenants include no in-flight distributions, or the under-full distribution is known to be a last remaining portion of the one or more distributions.

X. The method of example O further includes identifying a current distribution, the current distribution being a distribution submitted to the HES and unconfirmed for completion, wherein the current distribution unconfirmed for completion includes at least one of: failing to receive asynchronous status messages associated with the current distribution from the HES, or failing to meet a predetermined policy condition associated with the current distribution.

Y. The method of example X further includes identifying a next distribution based, at least in part, on: priority of candidate operations associated with a next set of CCRs, priority of candidate distributions booked with the next set of CCRs, and a wait time of booked unicast CCRs for a unicast batch distribution.

Z. The method of example Y, wherein identifying the next distribution includes identifying the next distribution yet to have CCRs assigned and proposing a new configured capacity for the next distribution.

AA. The method of example Y, wherein identifying the next distribution includes: determining that the next distribution invalidates an existing distribution, the existing distribution having existing CCRs booked and yet to be submitted to the HES, clearing the existing CCRs, and re-proposing the existing distribution.

AB. The method of example Y further includes, in response to identifying the next distribution and failing to identify the current distribution, submitting the next distribution to the HES.

AC. A system includes one or more processors and memory, which is coupled to the one or more processors and stores thereon computer-executable instructions that, when executed by the one or more processors, cause the one or more processors to perform operations. The operations include: determining, for each target tenants of a plurality of target tenants, a corresponding last unicast configuration change request (CCR) received; determining a number of previously unbooked unicast CCRs for the plurality of target tenants, a previously unbooked unicast CCR being a last unicast CCR received that has not been booked into a distribution to be submitted to a headend service (HES); booking the previously unbooked unicast CCRs into one or more distributions based on the number of the previously unbooked unicast CCRs and a configured capacity of each distribution of the one or more distributions; and sending the one or more distributions to the HES for sending the booked previously unbooked unicast CCRs to the plurality of target tenants.

AD. The system of example AC, wherein determining, for each target tenant of the plurality of target tenants, the corresponding last unicast CCR received includes determining an operation identification (ID) of the corresponding last unicast CCR and setting a boundary, based on the operation ID, for refraining from booking a CCR arriving after the boundary into a distribution.

AE. The system of example AC, wherein the operations further include 1) creating an under-full distribution associated with the one or more distributions, the under-full distribution being a distribution having a number of booked previously unbooked CCRs that is less than the configured capacity, and 2) sending the under-full distribution to the HES responsive to at least one of: configuration send channels of the plurality of target tenants include no in-flight distributions, or the under-full distribution is known to be a last remaining portion of the one or more distributions.

AF. The system of example AC, wherein the operations further include 1) identifying a current distribution, the current distribution being a distribution submitted to the HES and unconfirmed for completion, wherein the current distribution unconfirmed for completion includes at least one of: failing to receive asynchronous status messages associated with the current distribution from the HES, or failing to meet a predetermined policy condition associated with the current distribution, and 2) identifying a next distribution based, at least in part, on: priority of candidate operations associated with a next set of CCRs, priority of candidate distributions booked with the next set of CCRs, and a wait time of booked unicast CCRs for a unicast batch distribution.

AG. The system of example AF, wherein identifying the next distribution includes identifying the next distribution yet to have CCRs assigned and proposing a new configured capacity for the next distribution.

AH. The system of example AF, wherein identifying the next distribution includes determining that the next distribution invalidates an existing distribution, the existing distribution having existing CCRs booked and yet to be submitted to the HES, clearing the existing CCRs, and re-proposing the existing distribution.

AI. The system of example AF, wherein the operations further include, in response to identifying the next distribution and failing to identify the current distribution, submitting the next distribution to the HES.

AJ. A non-transitory computer-readable storage medium stores thereon computer executable instructions that, when executed by one or more processors, cause the one or more processors to perform operations. The operations include: determining, for each target tenants of a plurality of target tenants, a corresponding last unicast configuration change request (CCR) received; determining a number of previously unbooked unicast CCRs for the plurality of target tenants, a previously unbooked unicast CCR being a last unicast CCR received that has not been booked into a distribution to be submitted to a headend service (HES); booking the previously unbooked unicast CCRs into one or more distributions based on the number of the previously unbooked unicast CCRs and a configured capacity of each distribution of the one or more distributions; and sending the one or more distributions to the HES for sending the booked previously unbooked unicast CCRs to the plurality of target tenants.

AK. The non-transitory computer-readable storage medium of example AJ, wherein determining, for each target tenant of the plurality of target tenants, the corresponding last unicast CCR received includes determining an operation identification (ID) of the corresponding last unicast CCR and setting a boundary, based on the operation ID, for refraining from booking a CCR arriving after the boundary into a distribution.

AL. The non-transitory computer-readable storage medium of example AJ, wherein the operations further include 1) creating an under-full distribution associated with the one or more distributions, the under-full distribution being a distribution having a number of booked previously unbooked CCRs that is less than the configured capacity, and 2) sending the under-full distribution to the HES responsive to at least one of configuration send channels of the plurality of target tenants include no in-flight distributions, or the under-full distribution is known to be a last remaining portion of the one or more distributions.

AM. The non-transitory computer-readable storage medium of example AJ, wherein the operations further include 1) identifying a current distribution, the current distribution being a distribution submitted to the HES and unconfirmed for completion, wherein the current distribution unconfirmed for completion includes at least one of failing to receive asynchronous status messages associated with the current distribution from the HES, or failing to meet a predetermined policy condition associated with the current distribution, and 2) identifying a next distribution based, at least in part, on priority of candidate operations associated with a next set of CCRs, priority of candidate distributions booked with the next set of CCRs, and a wait time of booked unicast CCRs for a unicast batch distribution.

AN. The non-transitory computer-readable storage medium of example AM, wherein identifying the next distribution includes determining that the next distribution invalidates an existing distribution, the existing distribution having existing CCRs booked and yet to be submitted to the HES, clearing the existing CCRs, and re-proposing the existing distribution.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method comprising:
determining, for each target tenant of a plurality of target tenants, a corresponding last unicast configuration change request (CCR) received;
determining a number of previously unbooked unicast CCRs for the plurality of target tenants, a previously unbooked unicast CCR being a last unicast CCR received that has not been booked into a first distribution to be submitted to a headend service (HES);
booking the previously unbooked unicast CCRs into one or more distributions based on the number of the previously unbooked unicast CCRs and a configured capacity of each distribution of the one or more distributions;
sending the one or more distributions to the HES for sending the booked previously unbooked unicast CCRs to the plurality of target tenants; and
identifying a current distribution, the current distribution being a second distribution submitted to the HES and unconfirmed for completion, the current distribution unconfirmed for completion including at least one of:
failing to receive asynchronous status messages associated with the current distribution from the HES, or
failing to meet a predetermined policy condition associated with the current distribution.

2. The method of claim 1, wherein determining, for each target tenant of the plurality of target tenants, the corresponding last unicast CCR received includes:
determining an operation identification (ID) of the corresponding last unicast CCR; and
setting a boundary, based on the operation ID, for refraining from booking a CCR arriving after the boundary into the first distribution.

3. The method of claim 1, further comprising:
creating an under-full distribution associated with the one or more distributions, the under-full distribution being a third distribution having a number of booked previously unbooked CCRs that is less than the configured capacity; and
sending the under-full distribution to the HES responsive to at least one of:
configuration send channels of the plurality of target tenants include no in-flight distributions, or
the under-full distribution is known to be a last remaining portion of the one or more distributions.

4. The method of claim 1, further comprising:
identifying a next distribution based, at least in part, on:
priority of candidate operations associated with a next set of CCRs,
priority of candidate distributions booked with the next set of CCRs, and
a wait time of booked unicast CCRs for a unicast batch distribution.

5. The method of claim 4, wherein identifying the next distribution includes:
identifying the next distribution yet to have CCRs assigned, and
proposing a new configured capacity for the next distribution.

6. The method of claim 4, wherein identifying the next distribution includes:
determining that the next distribution invalidates an existing distribution, the existing distribution having existing CCRs booked and yet to be submitted to the HES,
clearing the existing CCRs, and
re-proposing the existing distribution.

7. The method of claim 4, further comprising:
in response to identifying the next distribution and failing to identify the current distribution, submitting the next distribution to the HES.

8. A system comprising:
one or more processors; and
memory coupled to the one or more processors, the memory storing thereon computer-executable instructions that, when executed by the one or more processors, cause the one or more processors to perform operations, the operations comprising:

determining, for each target tenant of a plurality of target tenants, a corresponding last unicast configuration change request (CCR) received;

determining a number of previously unbooked unicast CCRs for the plurality of target tenants, a previously unbooked unicast CCR being a last unicast CCR received that has not been booked into a first distribution to be submitted to a headend service (HES);

booking the previously unbooked unicast CCRs into one or more distributions based on the number of the previously unbooked unicast CCRs and a configured capacity of each distribution of the one or more distributions;

sending the one or more distributions to the HES for sending the booked previously unbooked unicast CCRs to the plurality of target tenants; and identifying a current distribution, the current distribution being a second distribution submitted to the HES and unconfirmed for completion, wherein the current distribution unconfirmed for completion includes at least one of:

failing to receive asynchronous status messages associated with the current distribution from the HES, or failing to meet a predetermined policy condition associated with the current distribution.

9. The system of claim 8, wherein determining, for each target tenant of the plurality of target tenants, the corresponding last unicast CCR received includes:

determining an operation identification (ID) of the corresponding last unicast CCR; and setting a boundary, based on the operation ID, for refraining from booking a CCR arriving after the boundary into the first distribution.

10. The system of claim 8, wherein the operations further comprise:

creating an under-full distribution associated with the one or more distributions, the under-full distribution being a third distribution having a number of booked previously unbooked CCRs that is less than the configured capacity; and sending the under-full distribution to the HES responsive to at least one of:

configuration send channels of the plurality of target tenants include no in-flight distributions, or the under-full distribution is known to be a last remaining portion of the one or more distributions.

11. The system of claim 8, wherein the operations further comprise:

identifying a next distribution based, at least in part, on:

priority of candidate operations associated with a next set of CCRs, priority of candidate distributions booked with the next set of CCRs, and a wait time of booked unicast CCRs for a unicast batch distribution.

12. The system of claim 11, wherein identifying the next distribution includes:

identifying the next distribution yet to have CCRs assigned, and proposing a new configured capacity for the next distribution.

13. The system of claim 11, wherein identifying the next distribution includes:

determining that the next distribution invalidates an existing distribution, the existing distribution having existing CCRs booked and yet to be submitted to the HES, clearing the existing CCRs, and re-proposing the existing distribution.

14. The system of claim 11, wherein the operations further comprise:

in response to identifying the next distribution and failing to identify the current distribution, submitting the next distribution to the HES.

15. A non-transitory computer-readable storage medium storing thereon computer executable instructions that, when executed by one or more processors, cause the one or more processors to perform operations, the operations comprising:

determining, for each target tenant of a plurality of target tenants, a corresponding last unicast configuration change request (CCR) received;

determining a number of previously unbooked unicast CCRs for the plurality of target tenants, a previously unbooked unicast CCR being a last unicast CCR received that has not been booked into a first distribution to be submitted to a headend service (HES);

booking the previously unbooked unicast CCRs into one or more distributions based on the number of the previously unbooked unicast CCRs and a configured capacity of each distribution of the one or more distributions; sending the one or more distributions to the HES for sending the booked previously unbooked unicast CCRs to the plurality of target tenants; and identifying a current distribution, the current distribution being a second distribution submitted to the HES and unconfirmed for completion, wherein the current distribution unconfirmed for completion includes at least one of:

failing to receive asynchronous status messages associated with the current distribution from the HES, or failing to meet a predetermined policy condition associated with the current distribution.

16. The non-transitory computer-readable storage medium of claim 15, wherein determining, for each target tenant of the plurality of target tenants, the corresponding last unicast CCR received includes:

determining an operation identification (ID) of the corresponding last unicast CCR; and setting a boundary, based on the operation ID, for refraining from booking a CCR arriving after the boundary into the first distribution.

17. The non-transitory computer-readable storage medium of claim 15, wherein the operations further comprise:

creating an under-full distribution associated with the one or more distributions, the under-full distribution being a third distribution having a number of booked previously unbooked CCRs that is less than the configured capacity; and sending the under-full distribution to the HES responsive to at least one of:

configuration send channels of the plurality of target tenants include no in-flight distributions, or the under-full distribution is known to be a last remaining portion of the one or more distributions.

18. The non-transitory computer-readable storage medium of claim 15, wherein the operations further comprise:

identifying a next distribution based, at least in part, on:

priority of candidate operations associated with a next set of CCRs, priority of candidate distributions booked with the next set of CCRs, and a wait time of booked unicast CCRs for a unicast batch
distribution.

19. The non-transitory computer-readable storage
medium of claim 18, wherein identifying the next distribu-
tion includes:

determining that the next distribution invalidates an exist-
ing distribution, the existing distribution having exist-
ing CCRs booked and yet to be submitted to the HES,
clearing the existing CCRs, and
re-proposing the existing distribution.

20. The non-transitory computer-readable storage
medium of claim 15, wherein the operations further com-
prise:

in response to identifying a next distribution and failing to
identify the current distribution, submitting the next
distribution to the HES.

* * * * *